United States Patent [19]

Birot et al.

[11] Patent Number: 5,028,678
[45] Date of Patent: Jul. 2, 1991

[54] EXTRUDABLE PRE-CERAMIC POLYCARBOSILANES

[75] Inventors: Marc Birot, Leognan; Jacques Dunogues, Talence; Pierre Olry, Bordeaux, all of France

[73] Assignee: Rhone-Poulenc Chimie, Courbevoie, France

[21] Appl. No.: 441,691

[22] Filed: Nov. 27, 1989

[30] Foreign Application Priority Data

Nov. 25, 1988 [FR] France ................. 88 15391

[51] Int. Cl.$^5$ ............................................. C08G 77/00
[52] U.S. Cl. ............................................ 528/10; 528/35
[58] Field of Search .................................. 528/10, 35

[56] References Cited

U.S. PATENT DOCUMENTS 4,100,233  7/1978  Yajima et al. .................... 423/345
4,939,197  7/1990  Su ..................................... 528/10

FOREIGN PATENT DOCUMENTS 2308590  11/1976  France .
2406650   5/1979  France .
2009195   6/1979  United Kingdom .

Primary Examiner—Melvyn I. Marquis
Attorney, Agent, or Firm—Burns, Doane, Swecker and Mathis

[57] ABSTRACT

Extrudable pre-ceramic polycarbosilanes are prepared by intimately contacting a crude polycarbosilane containing a fraction of high molecular weight polymers (e.g., molecular weights greater than about 25,000) with ethyl acetate, whereby selectively dissolving desired extrudable polycarbosilane essentially devoid of such fraction of high molecular weight polymers in the ethyl acetate, and then recovering such dissolved polycarbosilane from the ethyl acetate solvent.

9 Claims, No Drawings

EXTRUDABLE PRE-CERAMIC POLYCARBOSILANES

BACKGROUND OF THE INVENTION

1. Field of the Invention

The present invention relates to the production of extrudable pre-ceramic polycarbosilanes, and, more especially, to the production of extrudable polycarboxilanes by intimately contacting a crude polycarbosilane containing a fraction of high molecular weight polymers with ethyl acetate and recovering dissolved extrudable polycarbosilanes from such ethyl acetate selective solvent.

2. Description of the Prior Art

It is known to this art to prepare silicon carbide fibers from polysilanes, by first rearranging such polysilane into polycarbosilane, next extruding the polycarbosilane in fibrous form and then converting the polycarbosilane fibers into ceramic silicon carbide fibers.

The heretofore known processes for rearranging a polysilane into a polycarbosilane result in the production of a heterogeneous polycarbosilane, i.e., a polycarbosilane that is heterogeneous both relative to its molecular weight distribution and to its degree of branching. Thus, a polycarbosilane is produced that is difficult to extrude. Hence, it is necessary to treat this raw polycarbosilane such as to provide a product that is easy to extrude and thereafter easily converted into silicon carbide ceramic material.

SUMMARY OF THE INVENTION

Accordingly, a major object of the present invention is the provision of a novel process for the production of extrudable pre-ceramic polycarbosilanes from raw (crude) polycarbosilanes containing polymers having a high molecular weight, in particular higher than about 25,000, wherein such high molecular weight polymers are essentially completely removed from the raw polycarbosilane by contacting same with ethyl acetate, and then recovering the fraction of the raw polycarbosilane dissolved in the ethyl acetate.

DETAILED DESCRIPTION OF THE PREFERRED EMBODIMENTS OF THE INVENTION

More particularly according to the present invention, the raw polycarbosilane used as the starting material is a product produced by the techniques described above, in particular described in FR 2,308,650, via thermal conversion of a polysilane (homo- or copolymer). This raw material comprises a variety of polymers having widely differing molecular weights and branching configurations, for example polymers having molecular weights ranging from 10,000 to more than 100,000.

It has now been found that in order to readily extrude such polycarbosilane, it is necessary to use a polymer (or copolymer) having a molecular weight distribution which is relatively narrow, for example ranging from approximately 15,000 to 25,000. The process according to the present invention makes it possible to eliminate from the raw polycarbosilane essentially all of the polymers having molecular weights greater than about 25,000.

To effect such elimination of the high molecular weight polymers from the raw polycarbosilanes, it has now unexpectedly been discovered that it is possible to accomplish this result by selective dissolution of a fraction of the raw polycarbosilanes in certain solvents. Among the solvent studied, it has been determined that ethyl acetate is admirable well suited for such purpose, from technical, industrial and economic standpoints.

Systematic studies of the solubility of polycarbosilanes in ethyl acetate and extrusion experiments carried out using the soluble products obtained have also shown that it is desirable to contact the raw polycarbosilanes with ethyl acetate at temperatures ranging from about 25° C. to about 55° C. If temperatures of less than 25° C. are used, it is possible that certain polymers having a relatively high molecular weight (for example a molecular weight of 20,000), which should be retained for the extrusion operation, are nonetheless eliminated, and, if temperatures higher than about 55° C. are used, the filaments obtained are often of poor quality due to the fact that they contain an excessive proportion of high molecular weight polymers.

The selection of a suitable polycarbosilane is further related to the ratio of the amount of the raw polycarbosilane to the amount of ethyl acetate. This ratio is of lesser technical importance than that resulting from an appropriate selection of temperatures. It should be appreciated that if the proportion of ethyl acetate is too low, there is a risk of not recovering all of the useful polymers from the raw polycarbosilane, and if the proportion of ethyl acetate is too high, it will be necessary, in order to recover the useful polymer, to eliminate, for example by evaporation, a very large amount of the solvent. In actual practice, approximately 1 part by weight of raw polycarbosilane is used for about 4 to 8 parts by weight of ethyl acetate.

Naturally, the fraction of the polycarbosilane not dissolved in the ethyl acetate, and which thus essentially consists of high molecular polymers, may have its own useful applications, in particular for the production of ceramic powders based on silicon carbide.

In order to further illustrate the present invention and the advantages thereof, the following specific examples are given, it being understood that same are intended only as illustrative and in nowise limitative.

EXAMPLES 1 TO 9

The operating procedure of these examples was as follows: a sample of raw polycarbosilane (PCS), the amount by weight of which is reported in the following Table, was added in small portions, under vigorous agitation, to a given amount (also reported in the following Table) of commercial ethyl acetate, at the temperature indicated for each example. The PCS used was synthesized by heating a polymethylsilane at 470° C. in an autoclave, utilizing the technique described in S. Yajima et al, *J. Mater. Sci.*, (13), 2569 (1978) and FR 2,308,650). Following the addition, agitation was maintained for 2 hours at the same temperature and the mixture filtered (on a Buchner funnel using a DURIEUX filter paper, for example slow filtering No. 111) as rapidly as possible.

The precipitate was then washed with 200 ml of additional ethyl acetate, at ambient temperature, and the solution was then evaporated in a rotating evaporator and subsequently dried in a vacuum oven, at 60° C. under 2-3 mm Hg, for a variable period of time, the duration of which is also indicated in the following Table.

Gel permeation chromatographic analysis confirmed that the "light products" obtained no longer contained high molecular weight polycarbosilanes (molecular weights higher than approximately 25,000) and extrusion tests confirmed that such light products could be formed into filaments and fibers having sufficient properties to permit subsequent working and conversion into ceramic materials.

EXAMPLE 10

The procedure of Examples 1-9 was repeated, except that 1 kg raw polycarbosilane was contacted with 4 l of ethyl acetate. The temperature was set at 27° C.

400 g of perfectly extrudable polycarbosilane were recovered that could easily be converted into ceramic materials.

TABLE

| Examples | Initial weight of PCS (g) (1) | Quantity of MeCOOEt (liters) (2) | Dissolution temperature (°C.) (3) | Duration of drying (hours) (4) | Weight of light products (g) (in % relative* to the starting materials) (5) | Weight of heavy products (g) (in % relative* to the starting materials) (6) |
|---|---|---|---|---|---|---|
| 1 | 750 | 6 | 50 | 36 | 497(66) | 248(32) |
| 2 | 900 | 7.2 | 50 | 4 | 660(73) | 255(28.3) |
| 3 | 1,000 | 6 | 30 | 14 | 582(58) | 430(43) |
| 4 | 1,000 | 6 | 30 | 14 | 530(53) | 500(50) |
| 5 | 1,000 | 6 | 30 | 4 | 618(62) | 430(43) |
| 6 | 1,000 | 6 | 35 | 36 | 575(57.5) | 425(42.5) |
| 7 | 1,000 | 6 | 35 | 4 | 475(47.5) | 530(53) |
| 8 | 1,000 | 6 | 35 | 4 | 600(60) | 400(40) |
| 9 | 1,000 | 6 | 35 | 3 | 540(54) | 480(48) |

*If the total amount of products recovered exceeded 100%, this was due to insufficient drying.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of an extrudable pre-ceramic polycarbosilane, comprising extracting with ethyl acetate a desired extrudable polycarbosilane essentially devoid of non-extrudable high molecular weight polymers from a crude polycarbosilane containing said high molecular weight polymers, whereby selectively dissolving desired extrudable polycarbosilane essentially devoid of high molecular weight polymers in said ethyl acetate, and thence recovering such dissolved polycarbosilane from said ethyl acetate solvent.

2. The process as defined by claim 1, said fraction of high molecular weight polymers having molecular weights greater than about 25,000.

3. The process as defined by claim 1, carried out at a temperature ranging from about 25° to 55° C.

4. The process as defined by claim 1, comprising intimately contacting about 1 part by weight of crude polycarbosilane per 4 to 8 parts by weight of ethyl acetate.

5. The extrudable polycarbosilane product of the process as defined by claim 1.

6. The extrudable polycarbosilane as defined by claim 5, having a molecular weight distribution ranging from about 15,000 to about 25,000.

7. An extrudable pre-ceramic polycarbosilane having a molecular weight distribution ranging from about 15,000 to 25,000.

8. An extrudate comprising the polycarbosilane as defined by claim 5.

9. An extrudate comprising the polycarbosilane as defined by claim 7.

* * * * *